Jan. 2, 1945.                B. C. ARMSTRONG                 2,366,231
                              GARDEN TOOL
                           Filed Dec. 8, 1943

Inventor
B. C. ARMSTRONG
By H. N. Foss
   J. G. Seegrist
Attorney

Patented Jan. 2, 1945

2,366,231

UNITED STATES PATENT OFFICE 2,366,231

GARDEN TOOL

Bernard C. Armstrong, Oklahoma City, Okla.

Application December 8, 1943, Serial No. 513,377

4 Claims. (Cl. 97—58)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a manually operated garden tool, such as a plow or cultivator, but also including other tools, such as garden hoes, rakes, and so forth, and has among its objects the provision of means whereby the operator may pull the tool while walking backward in front thereof, leaving his hands free to hold the tool handle and guide it. This makes for ease in operation, since a person can pull harder with less resulting fatigue when pulling force is transmitted from the hips and when walking backward than when walking forward; enables the operator to walk on the unplowed or untilled soil, thus preventing packing of the freshly tilled soil due to footsteps; and, by placing the operator in front of the tool, enables him to clean trash and so forth from the blade of the tool with his foot.

Figure 1:
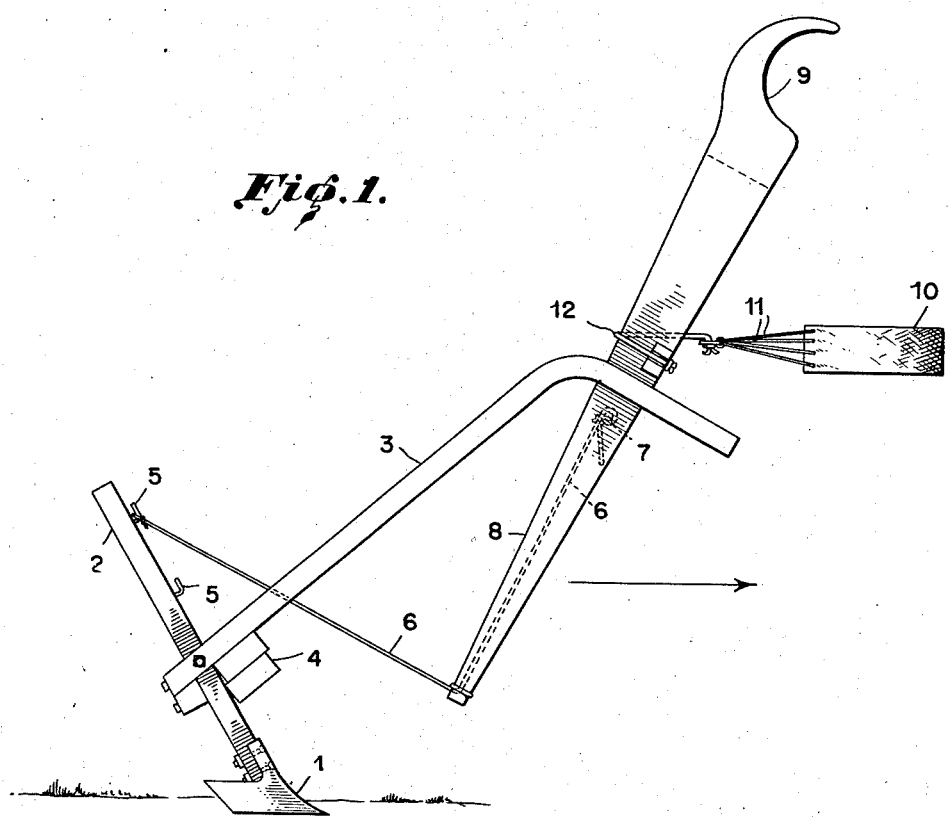
Figure 2:
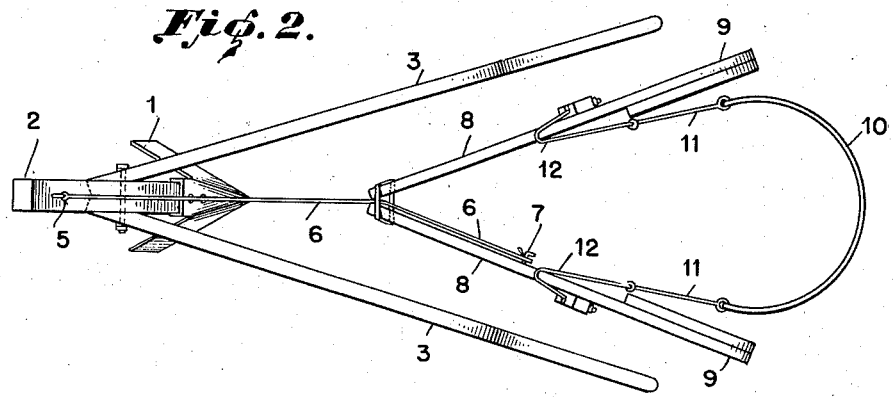

The details of the invention are illustrated in the accompanying drawing, in which Figure 1 is a side view of a plow and of a harness for hitching the operator to the plow; and Figure 2 is a top view thereof.

The plow proper has a soil tillage device 1, which, as illustrated in the drawing, is a plow point, but which may be a cultivator, rake, or other type of tool, to which is attached an upright 2. A pair of handles 3 is attached to the upright 2, and extends forwardly in the manner shown. A weight, such as bricks 4, may be attached to the plow in any desired manner (not shown) to hold it in the ground. A plurality of spaced hooks 5 is provided on the upright, for a purpose to be later described.

The harness proper has a tug 6, preferably an ordinary piece of sash cord. Another cord is looped around the lower end of a rigid elongated frame consisting of a pair of divergently extending rigid members 8 made of wood or any other suitable material. The sash cord is secured to the garden tool by fastening one end to a selected one of hooks 5, the other end of the cord being threaded through or under the loop joining members 8, and hooked over a peg 7 fixed on one of the members 8. By this means the tug 6 can be hitched to the plow by merely hooking one end to hook 5, and may be adjusted for effective length by altering the length of the cord at its anchorage to peg 7.

The pair of members 8 extends upwardly and each member is provided with a body rest 9 at its upper end, such as a shoulder rest shaped to engage over the shoulder and under the arm pit of the operator.

A breech pad 10 in the form of a flexible strap is attached at its ends by means of cords 11 and ropes 12 to members 8. An adjustable attachment is here obtained by merely knotting the free end of at least one of the ropes 12, and after looping it about member 8, passing it between a pair of cleats secured to member 8, so narrowly spaced apart that the knot cannot pass between them. Thus, the breech pad is attached to the garden tool through the frame and tug.

In using the plow, the operator, after adjusting the breech pad 10 and tug to fit and hitching himself to the plow, grips the handles 3, and with the shoulder rests 9 engaging his shoulders and the breech 10 properly positioned, walks backward in front of the plow, applying pulling force through the breech 10, ropes 12, members 8 and tug 6, to pull the plow through the soil, the while guiding it by the handles 3.

The harness may be used with other types of tools; for example, with an ordinary garden rake, in which event the loop joining members 8 is brought to bear near the lower end of the handle of the rake, and the operator while pulling the rake holds the free end of the handle, weights being fastened to the rake if desired.

The parts as shown are all easily constructed from readily obtainable materials, and the whole, although quite simple, is very effective.

Having thus described the invention, what is claimed is:

1. A harness for hitching a person to a manually operated tool comprising: a pair of elongated rigid members secured together at their lower ends, divergently extending toward their upper ends, and each having a shoulder rest at its free upper end; a tug attached to the members at their lower ends and having detachable means for securing it to the tool; and a breech pad in the form of a flexible strap having each of its ends attached to one of the members at a point between the lower end and the shoulder rest.

2. A harness for hitching a person to a manually operated tool comprising a rigid elongated frame having a body rest at its upper end, a tug attached to the frame at the lower end and having detachable means for securing it to the tool, and a flexible breech pad attached to the frame at a point between its ends.

3. A harness for hitching a person to a manually operated tool comprising a rigid elongated frame having a body rest at its upper end, a breech pad attached to the frame at a point between its ends, and a flexible tug for detachable securement at its one end to the tool, said tug being threaded through a loop on the lower end of the frame and having its other end adjustably attached to the frame, whereby the effective length of the tug may be varied.

4. The combination with a manually drawn tool having a handle extending forwardly therefrom of a harness for hitching a person to the tool, said harness comprising a rigid elongated frame having a body rest at its upper end, a tug attached to the frame at its lower end and secured to the tool, and a flexible breech pad attached to the frame at a point between its ends.

BERNARD C. ARMSTRONG.